United States Patent
Lifson et al.

(10) Patent No.: US 6,354,822 B1
(45) Date of Patent: Mar. 12, 2002

(54) OIL RETENTION IN COMPRESSOR SLIDER BLOCK

(75) Inventors: Alexander Lifson, Manlius; James W. Bush, Skaneateles, both of NY (US)

(73) Assignee: Scroll Technologies, Arkadelphia, AR (US)

(*) Notice: Subject to any disclaimer, the term of this patent is extended or adjusted under 35 U.S.C. 154(b) by 0 days.

(21) Appl. No.: 09/571,824

(22) Filed: May 16, 2000

(51) Int. Cl.[7] .............................................. F01C 1/02
(52) U.S. Cl. ...................... 418/55.6; 418/55.5; 418/57; 384/284; 384/322; 384/389; 384/392; 184/6.3
(58) Field of Search ...................... 418/55.5, 57, 55.6; 384/284, 322, 389, 392; 184/6.3

(56) References Cited

U.S. PATENT DOCUMENTS

| | | | | |
|---|---|---|---|---|
| 507,072 A | * | 10/1893 | Kitton | 384/284 |
| 902,831 A | * | 11/1908 | Petersen | 384/392 |
| 1,637,317 A | * | 7/1927 | Shoemaker | 384/284 |
| 1,746,020 A | * | 2/1930 | Whiteley | 384/284 |
| 4,274,684 A | * | 6/1981 | Richfield | 308/36.1 |
| 4,403,927 A | * | 9/1983 | Butterworth et al. | 418/88 |
| 5,011,384 A | * | 4/1991 | Grunwald et al. | 418/55.5 |
| 5,017,107 A | * | 5/1991 | Fraser, Jr. et al. | 418/55.5 |
| 5,076,772 A | * | 12/1991 | Fraser, Jr. et al. | 418/55.5 |
| 5,087,181 A | * | 2/1992 | Kamitsuma et al. | 418/178 |
| 5,174,738 A | * | 12/1992 | Baumann et al. | 418/55.5 |
| 5,439,361 A | * | 8/1995 | Reynolds et al. | 418/55.6 |
| 6,053,714 A | * | 4/2000 | Fenocchi et al. | 418/55.5 |
| 6,089,756 A | * | 7/2000 | Ono et al. | 384/322 |

FOREIGN PATENT DOCUMENTS

| | | | | |
|---|---|---|---|---|
| JP | 58-077917 | * | 5/1983 | 384/322 |
| JP | 02008510 A | * | 1/1990 | 384/392 |
| JP | 04-307112 | * | 10/1992 | 384/322 |

* cited by examiner

Primary Examiner—Thomas Denion
Assistant Examiner—Theresa Trieu
(74) Attorney, Agent, or Firm—Carlson, Gaskey & Olds

(57) ABSTRACT

Oil retention recesses are formed in an outer periphery of the slider block of a scroll compressor. The recesses insure that a quantity of oil is captured and maintained during operation and after shutdown of the scroll compressor. If the scroll compressor is operated or started back up during a "starved" lubricant condition, the captured oil insures the scroll compressor can operate without damage for a period of time such that lubricant can be returned to the sealed compressor.

9 Claims, 1 Drawing Sheet

OIL RETENTION IN COMPRESSOR SLIDER BLOCK

BACKGROUND OF THE INVENTION

This application relates to a unique way of maintaining a small amount of lubricant in a scroll compressor slider block/bearing interface to provide short-term lubrication for a compressor during a starved lubrication start-up or operation.

Sealed compressors are part of many refrigerant compression systems. A refrigerant cycle includes a number of elements, and a refrigerant moves between the elements when the cycle is operational. Refrigerant flow lines connect the elements, and the refrigerant flows between the compressor and elements such as the condenser, the evaporator and the expansion valve, etc. At the same time, lubricant may also flow between the several components.

Often at shutdown of the system, the lubricant can drain from one of the components. This becomes particularly acute for the compressor during long periods of shutdown. A refrigerant compressor typically includes a number of inter-engaging or rotating parts which must be supplied with sufficient lubricant to preserve the parts. However, if the lubricant has moved outwardly of the compressor, there may be insufficient lubricant for proper operation of the compressor. Such a "starved lubricant" situation will often occur when the refrigerant cycle has been shut down for a long period of time. At start-up, the refrigerant and the lubricant will again begin to flow between the various element of the cycle, and after a short period of time the lubricant will return to the compressor housing. However, in the past, compressors have sometimes been damaged during this start-up time. Other events occurring during operation of the refrigerant cycle may also cause momentary loss of oil supply at the compressor.

One type of modern refrigerant compressor is a scroll compressor. In a scroll compressor, a pair of scroll members each include a base and a generally spiral wrap extending from the base. The wraps interfit to define compression chambers. One of the two scroll members is caused to orbit relative to the other. Typically, a shaft is driven by a motor and has an eccentric extending upwardly into a slider block. The slider block is mounted within a bearing in the orbiting scroll member. There is a loaded and unloaded position between the eccentric and the slider block. The force transmitted between the eccentric and the slider block at the loaded position may be substantial, and during operation of a scroll compressor it is important to have a film of lubricant between the slider block and its bearing.

However, during the starved lubricant conditions mentioned above, there is no lubricant, and damage can quickly occur.

SUMMARY OF THE INVENTION

In a disclosed embodiment of this invention, the drive interface between a rotating shaft and a compressor pump unit element is provided with a lubricant retention feature. More preferably, the drive interface is between the slider block and the bearing in a scroll compressor. In the inventive preferred embodiment, oil retention grooves are formed in the outer periphery of the slider block. The oil retention grooves are structured such that they will not drain to the sump at shutdown or during a loss of oil supply during operation. That is, the grooves extend into the surface of the slider block, but do not communicate to an end of the slider block.

Preferably, the retention grooves are greater than the oil film thickness by an order of magnitude. In this way, oil is retained in the grooves such that there will be sufficient lubricant to form a thin lubricant film between the slider block and the bearing during oilstarved operation or at start-up should start-up occur in an otherwise "starved" lubricant condition. To that end, the grooves preferably have a depth between 200 microns to three millimeters. The term "grooves" is used in this application to include any structure or recess formed into the outer peripheral surface of the slider block. In preferred embodiments there are actually a plurality of indentations having a diameter on the order of two millimeters. However, grooves extending circumferentially or axially, and not extending to the ends of the bearing may also be utilized.

More preferably, the grooves are formed at a circumferential extent spaced from the area or position of load transmission between the slider block and bearing at a loaded condition. At the loaded position there is a very thin film of very high pressure oil between the slider block and bearing during full operation of the scroll compressor. Forming the indentations at a location spaced from this loaded position will ensure that the indentations will not disrupt any creation of the oil film in the critical loaded position of the slider block during normal operation of the compressor.

In sum, recesses are formed in an outer periphery of the slider block of a scroll compressor. The recesses maintain a quantity of oil even after a long period of shutdown. At start-up, or in an otherwise starved lubricant condition, the recesses supply lubricant to the interface between the slider block and the orbiting scroll bearing. This lubricant allows the scroll compressor to operate without damage for a period of several minutes. This time should be sufficient for the entire refrigerant charge to recycle through the system to return lubricant to the compressor.

These and other features of the present invention can be best understood from the following specification and drawings, the following of which is a brief description.

DETAILED DESCRIPTION OF A PREFERRED EMBODIMENT

Figure 1:
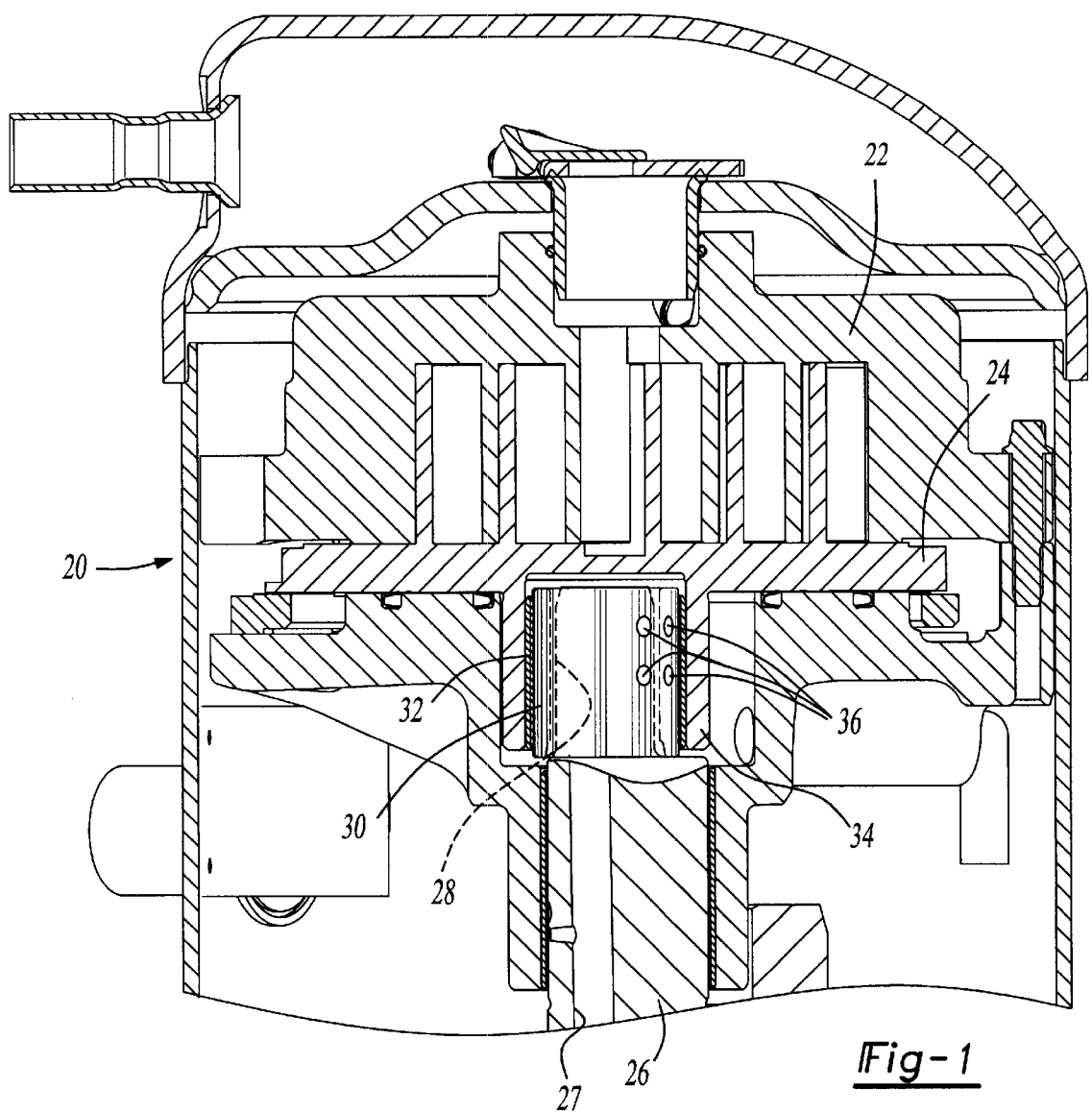
FIG. 1 is a cross-sectional view through a scroll compressor showing the invention.

A sealed compressor 20 is illustrated having a non-orbiting scroll member 22 and an orbiting scroll member 24. As known, each scroll includes a base and a generally spiral wrap extending from the base and interfitting with the other wrap to define compression chambers. A shaft 26 is driven by an electric motor and has an eccentric 28 extending upwardly into a slider block 30. As known, the slider block 30 has an inner peripheral surface that provides loaded and unloaded positions relative to the eccentric, as is well known in the scroll art. An orbiting scroll bearing 32 is placed between an outer peripheral surface of slider block 30 and an inner peripheral surface of a neck 34 from the orbiting scroll 24. As is known, during operation, the eccentric 28 contacts a surface on the inner periphery of the slider block 30, and drives the slider block 30 within the bearing 32. The orbiting scroll 24 is caused to orbit by this interaction between it, the slider block 30, and the shaft 26, as the shaft rotates. In another embodiment, the outer peripheral surface 30 of the slider block and shaft 26 may be formed of a single piece.

Figure 2:
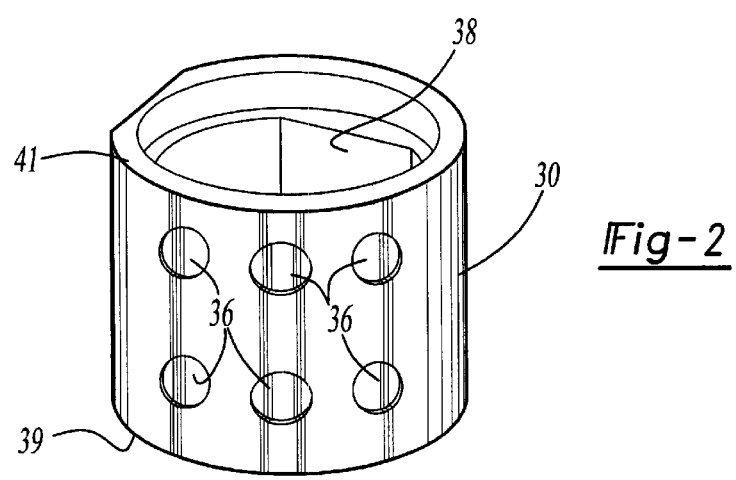
FIG. 2 is a prospective view showing an embodiment of the present invention.

A plurality of recesses 36 are shown on the outer peripheral surface of the slider block 30. Preferably, the recesses 36 are formed at a location which is circumferentially removed from a loaded position between the slider block 30 and bearing 32 during operation of the scroll compressor. As can be seen in FIG. 2, the slider block 30 has a planar face 38 on an inner peripheral bore. It is this face which is contacted by the eccentric 28 during the loaded operation of the scroll compressor and generally corresponds with the circumferential portion of the loaded position on the outer peripheral surface of slider block 30. As can be seen, the recesses 36 are formed on the outer periphery of the slider block 30 at a position circumferentially spaced from surface 38 and thus also spaced from the loaded position. Thus, the recesses will not interfere with the provision of the necessary oil film at the loaded position during operation of the scroll compressor. Instead, the recesses are at a much less critical location on the slider block.

Preferably, the recesses have a depth which is significantly greater than the necessary oil thickness such that the oil retained in the recesses will be sufficient to provide the oil film around the inner periphery of the slider block during "starved" lubricant operation.

In general, this requires the recesses have a depth of at least 200 microns. The recesses may be arbitrarily deep, but practically need not be deeper than three millimeters. In one prototype, recesses of a depth of two millimeters provided the intended function adequately. While the recesses are illustrated as generally circular indentations, other structures that would retain oil may also be utilized. In general, what is necessary is a recess that will capture oil and not drain during shutdown or during momentary oil starvation when running. Typically, this would be achieved by recesses which do not extend to the axial ends 39 and 41, or at least the vertically lower axial end 39 of the slider block. Such a recess is prevented from draining by gravity during shutdown, and will maintain a quantity of oil.

As known, a lubricant supply passage 27 extends vertically through the shaft to supply lubricant from a lubricant sump upwardly to the interface between the eccentric pin, slider block and orbiting scroll bearing. This passage will also supply oil to recess 36 during operation of the compressor via the clearance between the slider block 30 and bearing 32.

Although the recesses are shown in the slider block, in some applications the recesses could be formed in the bearing inner surface. Further, while the recesses are shown as applied on the orbiting scroll bearing and slider block, they may also be applied between the crankcase bearing 44 and shaft 26. Further, while this invention is illustrated in a compressor with a vertical shaft orientation, it will also benefit compressors with a horizontal shaft orientation or an orientation at some other angle. Further, while the present invention is illustrated specifically in the scroll compressor, it should be understood that other compressors may benefit from this invention.

While a preferred embodiment has been disclosed, a worker in this art would recognize that many modifications would come within the scope of this invention. For that reason, the following claims should be studied to determine the true scope and content of this invention.

What is claimed is:

1. A sealed compressor comprising:

a shaft and including a lubricant passage extending along an axis of said shaft for supplying a lubricant;

a pump unit being driven by said shaft through a drive interface, a bearing disposed at said drive interface; and at least one recess for maintaining a quantity of oil at an interface between said drive interface and said bearing, said recess being structured to maintain a quantity of oil, said oil being delivered through said passage in said shaft.

2. A compressor as recited in claim 1, wherein said recesses do not extend to a vertically lower axial end of said bearing or drive interface such that said recesses maintain a quantity of oil.

3. A compressor as recited in claim 1, wherein said recesses are formed by a plurality of indentations.

4. A compressor as recited in claim 3, wherein said recesses have a depth which is greater than the minimum desired oil film thickness between said interface and said bearing.

5. A compressor as recited in claim 1, wherein said pump unit is a scroll compressor and said drive interface is between a slider block and an orbiting scroll, and said recesses are formed on an outer periphery of said slider block.

6. A compressor as recited in claim 1, wherein said shaft is supported in a crankcase with a crankcase bearing, and said drive interface is between said crankcase bearing and said shaft.

7. A scroll compressor comprising:

a first scroll member having a base and a generally spiral wrap extending from said base;

a second scroll member having a base and a generally spiral wrap extending from said base; said wraps of said first and second scroll members intermitting to define compression chambers;

a shaft having an eccentric pin extending from one end of said shaft, said eccentric pin extending upwardly into a slider block, said slider block being received in said second scroll member with a bearing positioned between an outer peripheral surface of said slider block and said second scroll member, said shaft including an oil passage extending along an axis of said shaft; and oil retention recesses formed between an outer peripheral surface of said slider block and said bearing, said oil retention recesses being constructed to preserve a quantity of oil in said recesses against gravity, said oil being delivered to said recesses through said passage and said shaft.

8. A scroll compressor as recited in claim 7, wherein said slider block has a loaded position which said eccentric pin will contact during operation of said scroll compressor, and said recesses are formed over a limited circumferential extent at a position spaced from said loaded position.

9. A scroll compressor as recited in claim 7, wherein said recesses have a depth of at least 200 microns.

* * * * *